(12) United States Patent
Ramsey

(10) Patent No.: US 6,347,699 B1
(45) Date of Patent: Feb. 19, 2002

(54) CONVEYOR CHAIN LINK

(76) Inventor: Earl Ramsey, 1739 Fair Way, Carson City, NV (US) 89701

( * ) Notice: Subject to any disclaimer, the term of this patent is extended or adjusted under 35 U.S.C. 154(b) by 0 days.

(21) Appl. No.: 09/547,963

(22) Filed: Apr. 12, 2000

Related U.S. Application Data

(60) Provisional application No. 60/164,325, filed on Nov. 8, 1999.

(51) Int. Cl.[7] ............................................... B65G 17/06
(52) U.S. Cl. ...................... 198/852; 198/850; 198/844.1
(58) Field of Search ............................. 198/850, 844.1, 198/852

(56) References Cited

U.S. PATENT DOCUMENTS

| | | | |
|---|---|---|---|
| 2,071,485 A | 2/1937 | Worrall | 198/189 |
| 2,319,617 A | 4/1943 | Manierre | 198/189 |
| 3,269,526 A | 8/1966 | Imes et al. | 198/189 |
| 3,768,631 A | 10/1973 | Wahren | 198/189 |
| 3,910,404 A | 10/1975 | Henrekson | 198/130 |
| 4,597,492 A | 7/1986 | Lachonius et al. | 198/852 |
| 5,826,705 A | * 10/1998 | Ramsey et al. | 198/853 |
| 6,209,716 B1 | * 11/1998 | Bogle et al. | 198/852 |
| 6,227,356 B1 | * 3/1999 | Van Zijderveld et al. | 198/850 |
| 6,213,292 B1 | * 5/1999 | Takahashi et al. | 198/853 |

FOREIGN PATENT DOCUMENTS

| | | | |
|---|---|---|---|
| AU | 206755 | 5/1955 | .................. 59/58.7 |
| GB | 380959 | 9/1932 | |
| GB | 1 298 231 | 4/1970 | ........... B65G/17/34 |
| GB | 1 501 619 | 11/1975 | ........... B65G/17/08 |
| SU | 377109 | 6/1973 | ........... B65G/39/00 |

* cited by examiner

*Primary Examiner*—H. Grant Skaggs
*Assistant Examiner*—Rashmi Sharma
(74) *Attorney, Agent, or Firm*—Sierra Patent Group, Ltd.

(57) ABSTRACT

A two piece pivot chain link which through its construction allows the top platform piece to be removably replaceable, additionally the pin attachment means can be frictionally placed in the main body of the pivot chain from the underside allowing for easy placement and removal.

7 Claims, 6 Drawing Sheets

CONVEYOR CHAIN LINK

CROSS REFERENCE TO RELATED APPLICATIONS

This application claims priority from U.S. Provisional Application Ser. No. 60/164,325 filed Nov. 8, 1999, the full disclosure of which is hereby incorporated by reference.

BACKGROUND OF THE INVENTION

1. Field of the Invention.

The present invention relates generally to conveyor chains and more particularly to an improved conveyor chain link.

2. The Prior Art.

Conveyor chain links are generally well known in the art. In particular applicant refers to U.S. Pat. No. 4,597,492 to Lachonius. et al. Conveyor chains links are linked together in order to provide a continuous chain upon which a variety of objects may be placed to facilitate their movement around, for instance, a factory. The chain construction allows the belt to navigate corners as well as other geometric and spatial problems. Often, the chain will carry caustic, abrasive and corrosive materials which after a period of time tend to eat away at the surface of the chain link. Eventually, notwithstanding the durability of the other elements of the chain link, the entire link must be replaced due to the wear suffered by the platform portion of the chain link. Additionally, links are attached to one another through the use of pins which are inserted in bores in the link. Since the pins are bore inserted they require a special punch tool to disassemble them adding additional time and effort to the replacement of worn out conveyor chain links.

Accordingly, it is an object of the present invention to provide a chain link that avoids or eliminates the above-mentioned problems.

SUMMARY OF THE INVENTION

The present invention is a conveyor chain link comprised of two pieces: a main portion which accommodates a drive means and provides the structure of the link, and a top platform portion which provides a platform upon which material can be placed and moved along by the conveyor belt. The two piece construction allows for the top platform portion to be removed independent of the chain link, i.e., if the top platform portion comes into frequent contact with abrasive and corrosive materials and is thereby more quickly damaged than the main body portion, it can be replaced with relative ease as opposed to replacing the entire chain link. Also, by inserting the pin snugly into an opening as opposed to a bore, disengagement of chain links is also more simply facilitated.

Further objects and advantages of the invention will become apparent from a consideration of the drawings and the ensuing description.

BRIEF DESCRIPTION OF THE DRAWINGS

In the drawings which illustrate the best modes presently contemplated for carrying out the present invention.

DETAILED DESCRIPTION OF A PREFERRED EMBODIMENT

Figure 1:
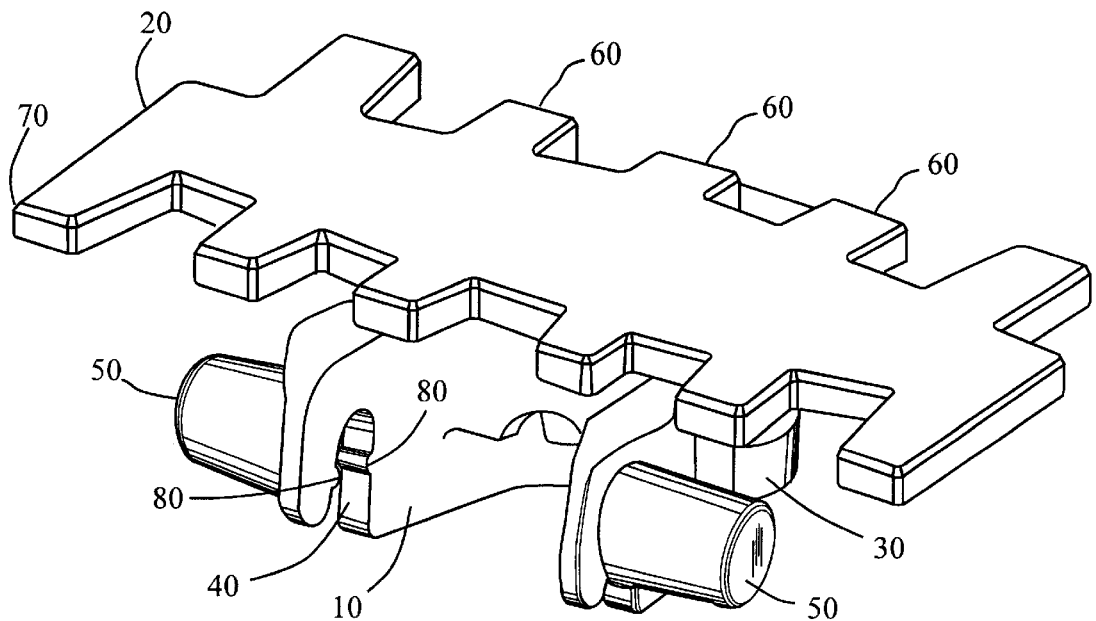
FIG. 1 is an isometric rear view of complete assembly of the invention.

Persons of ordinary skill in the art will realize that the following description of the present invention is illustrative only and not in any way limiting. Other embodiments of the invention will readily suggest themselves to such skilled persons having the benefit of this disclosure.

Considering the drawings, wherein like reference numerals denote like part throughout the various drawing figures, reference numeral 10 is directed to the apparatus according to the present invention. The top removable platform portion is denoted by numeral 20. The main body portion is denoted by numeral 30.

Referring to FIGS. 1, 4, 6, 7, 8, 9 and 10, it can be seen that the top removable platform portion 20 may be connected to main body portion 30. Pin opening 40, is shown which can frictionally and easily receive pins to link multiple links together. The main body portion 30 contains trunnions 50, which allow placement of a pin therethrough from the pin opening, 40 underneath. The top platform slat 20 has forward teeth, 60 and rearward teeth 70, which allow multiple platform slats to nestably engage one another to form a continuous platform. Friction bumps 80 promote secure fastening of a pin.

Figure 2:
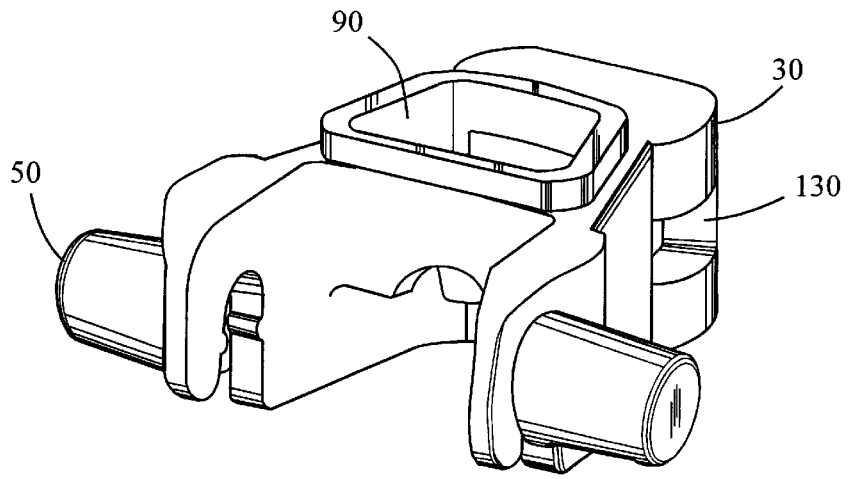
FIG. 2 is an isometric rear view of the main body portion of the invention.
Figure 3:
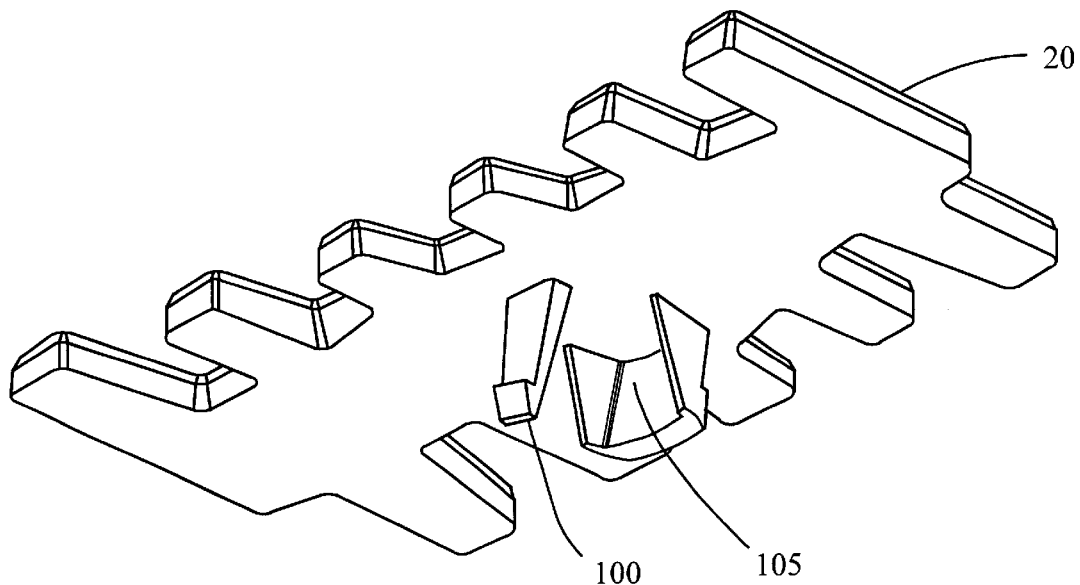
FIG. 3 is an isometric bottom view of the top platform portion of the invention.
Figure 4:
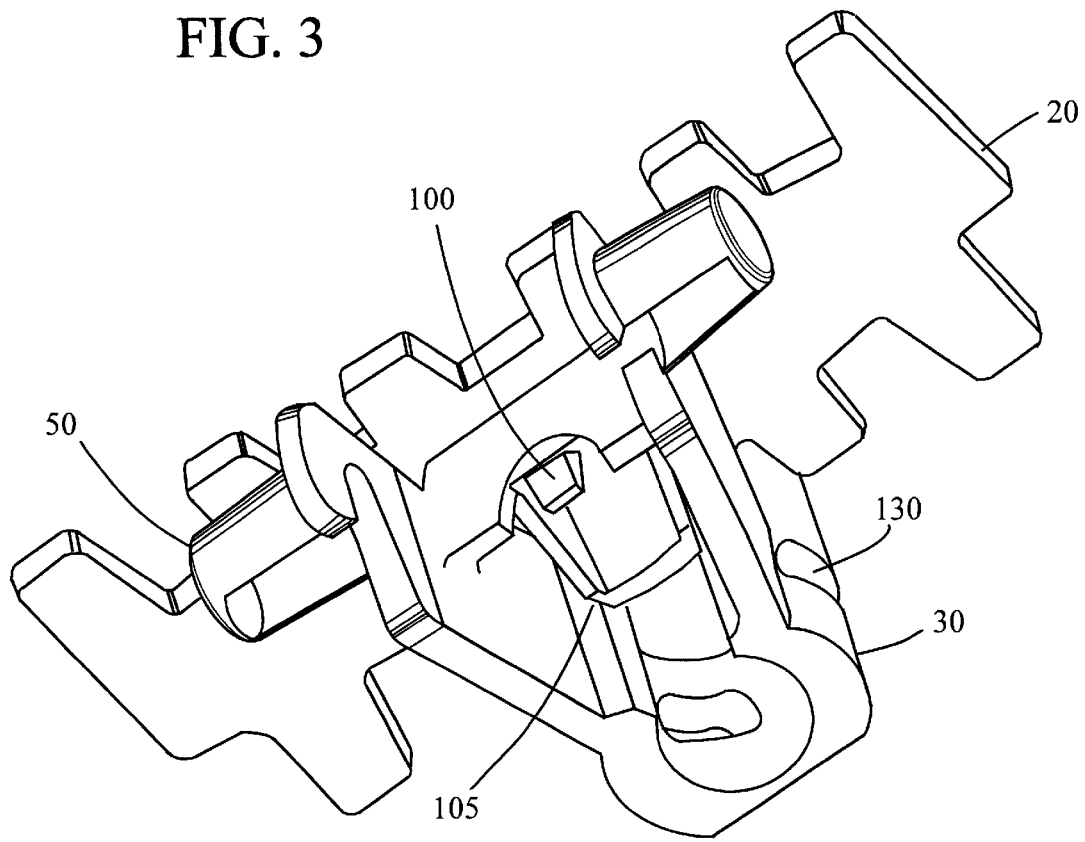
FIG. 4 is an isometric bottom view of the two piece pivot chain link assembly.
Figure 5:
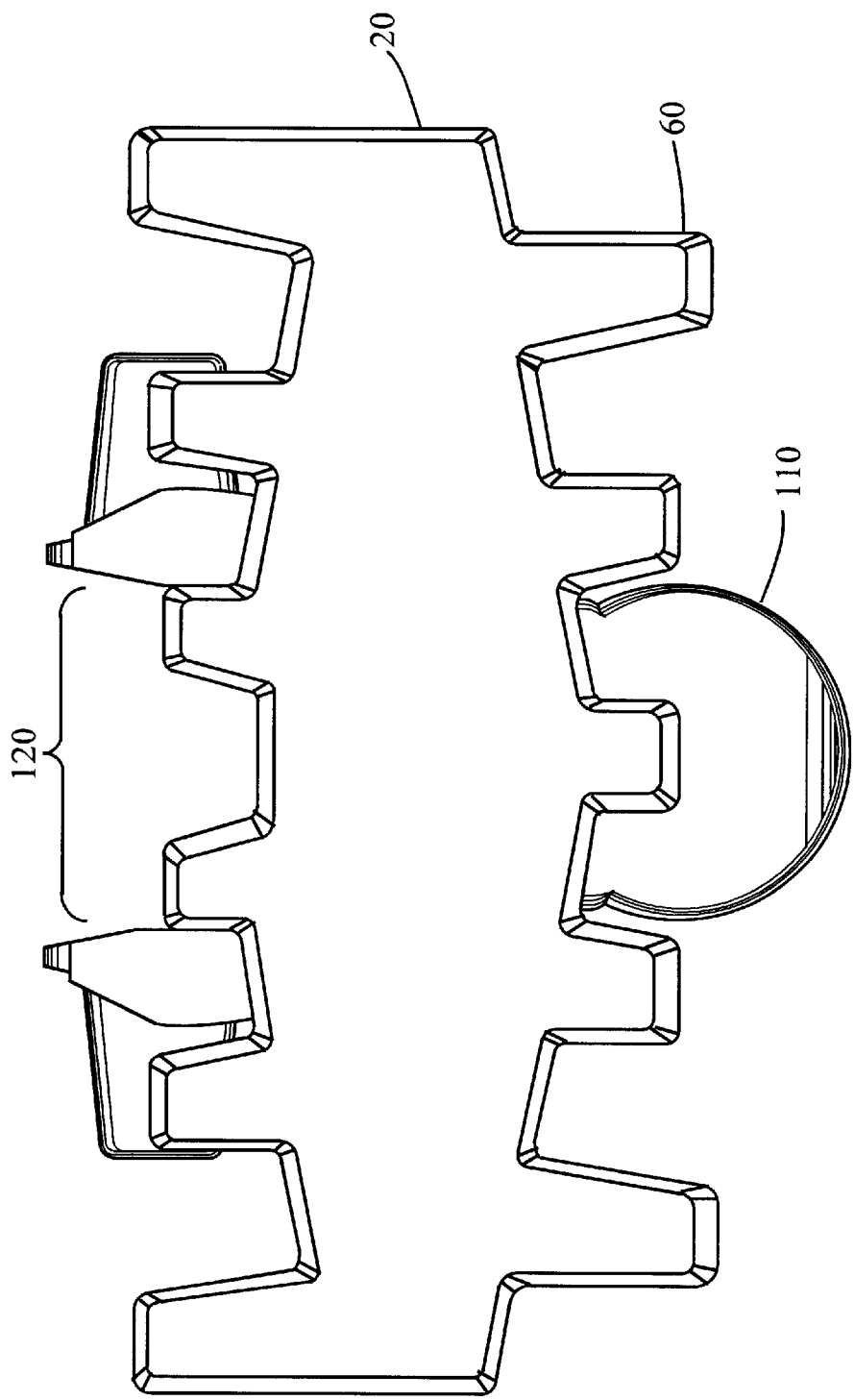
FIG. 5 is top view of the two piece pivot chain link.
Figure 6:
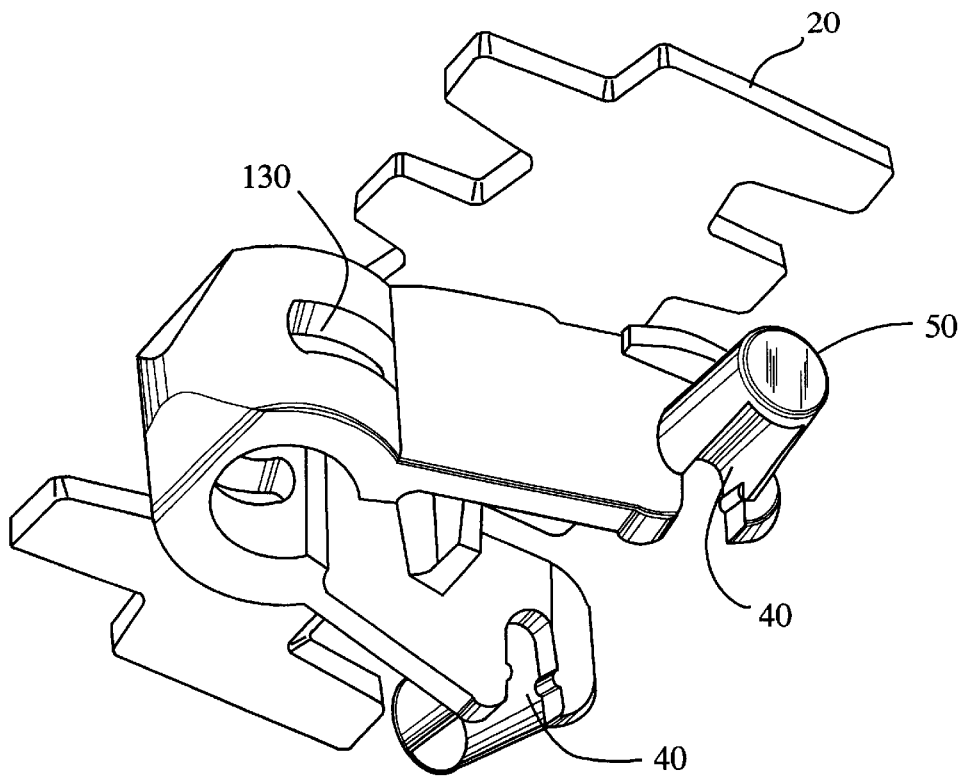
FIG. 6 is an isometric bottom view of the two piece pivot chain link.
Figure 7:
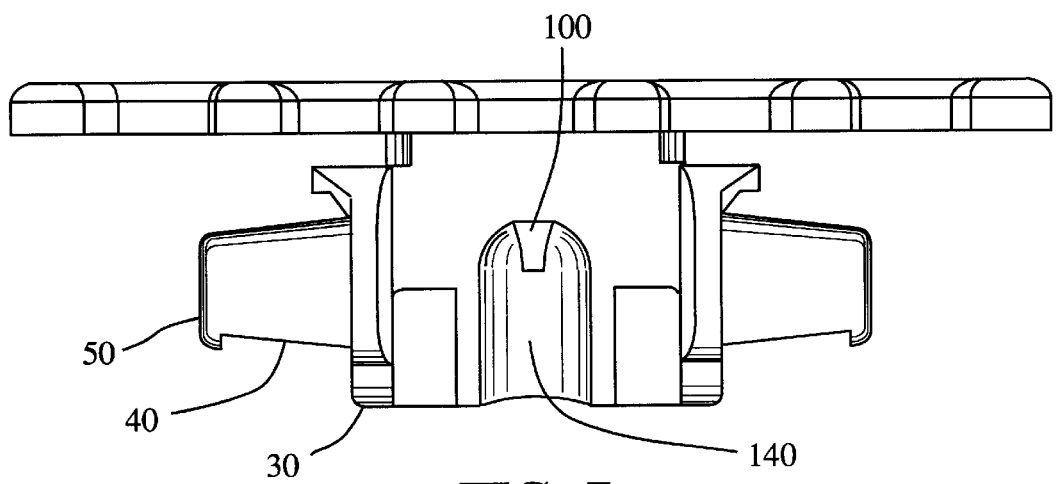
FIG. 7 is a back view of the two piece pivot chain link.
Figure 8:
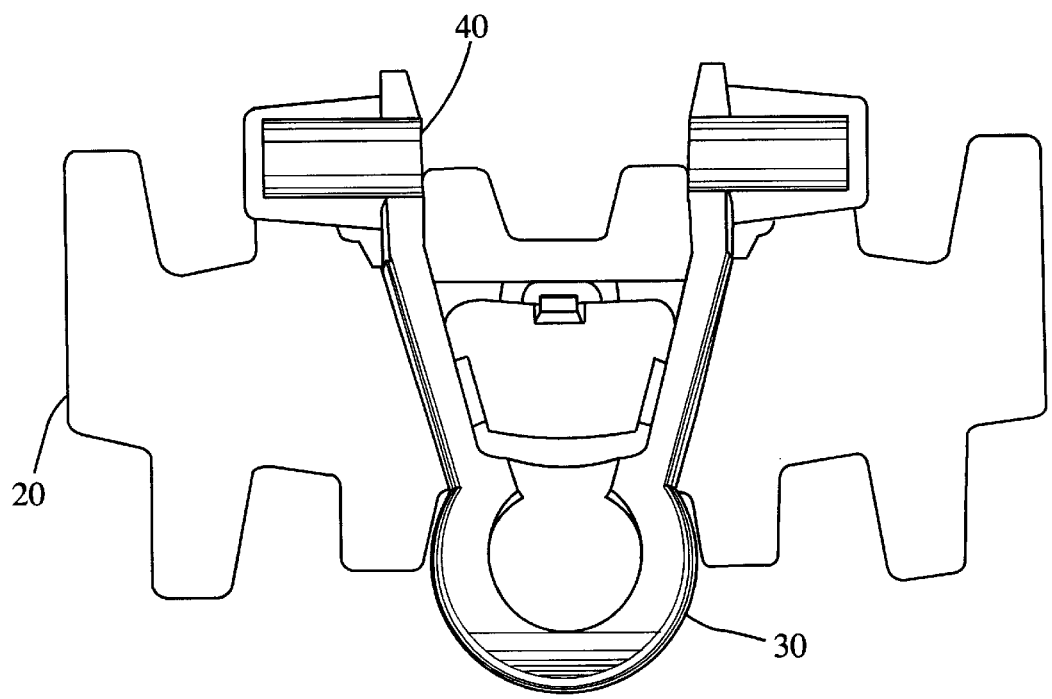
FIG. 8 is the bottom view of the two piece pivot chain link.
Figure 9:
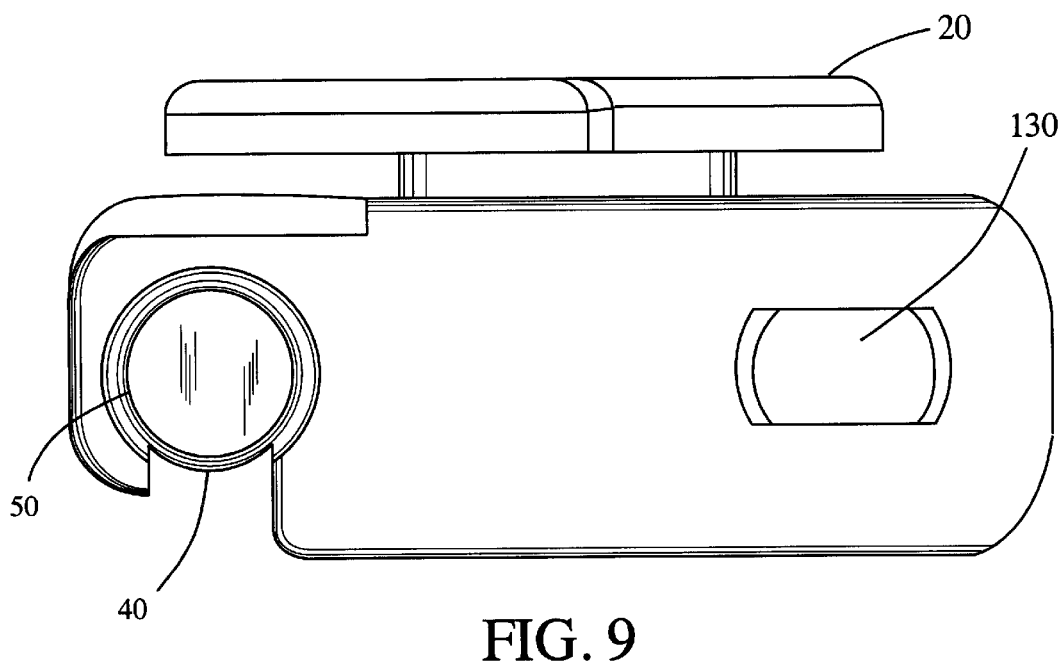
FIG. 9 is the side view of the two piece pivot chain link.
Figure 10:
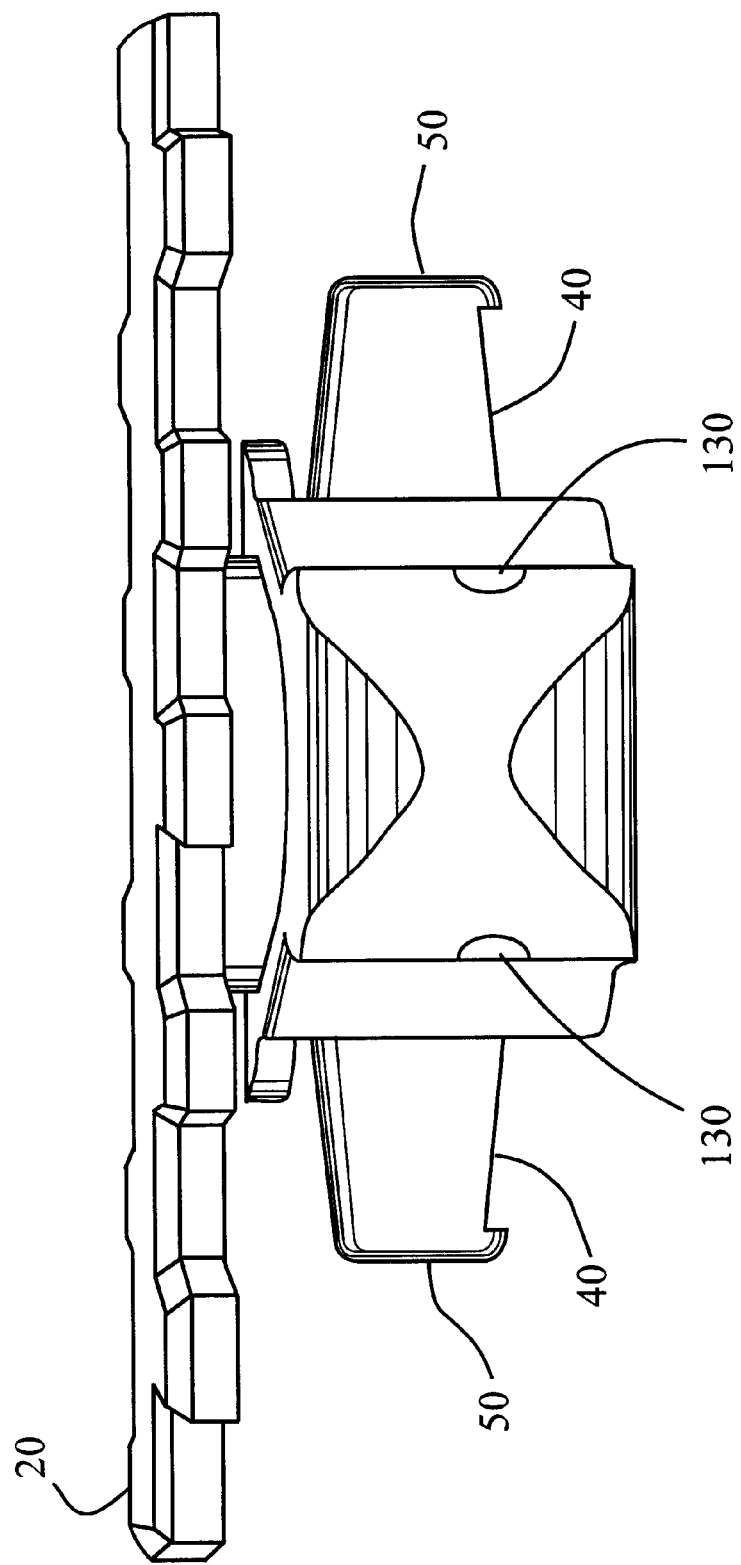
FIG. 10 is the front view of the two piece pivot chain link.

Referring to FIG. 2, shown is the main body portion 30 with the top platform slat removed. The main body orifice 90 removably receives top platform slat. Referring to FIG. 3, snap tabs 100 and 105 protruding from the bottom of the top platform slat perpindicular to the top platform slat are shown. The top platform snap tabs 100 and 105 are inserted into the top of the main body orifice 90 and snapedly engaged to form one complete unit as shown in FIGS. 1, 4, 5, 6, 7, 8, 9, 10. A completed chain is formed by attaching links together. Referring to FIG. 5, the protruding front end male coupling member portion 110 of one link is placed into the female coupling member shaped back end 120 of an identical link. Two links can be connected together by a pin which as shown in FIG. 6 can be placed in the front end pin receptacle 130 of the rear link and the rear end pin opening 40 of the forward link. The front end pin receptacle 130 is elliptical and is a channel bored in the transverse direction. The elliptical shape does not constrain the pin and allows freedom of movement in the horizontal plane allowing the forward portion of a link to rotate about the rearward portion of an identical link.

The rear end pin receptacle 40 is a u-shaped channel to allow the insertion of a pin from the underside. From the transverse direction it is also a bore in parallel with the front end pin receptacle 130.

In order to place a top platform slat on the main body portion, it is merely pressed into the main body orifice 70 until the snap tab engages the main body. Removal of the top platform slat is accomplished by applying pressure to the snap tab, 100 through the access slot 140. Chain links can be delinked from one another, by simply prying loose the pin from the rear end pin openings, 40. The link can be manufactured by injection molding using acetal as the material of manufacture.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced.

What is claimed is:

1. A pivot chain link, comprising:

a link body having a male coupling member at a first end and a female coupling member at a second end opposite said first end, said male coupling member and said female coupling member aligned along an axis;

said male coupling member having a horizontal slot formed therethrough running in a direction perpendicular to said axis, said slot adapted for slideably receiving a coupling pin therethrough; and said female member defined by a pair of opposing arms, each of said arms including a vertically-oriented channel formed therein and open at one end thereof, said channels disposed opposite one another in a direction perpendicular to said axis, said channels each including at least one detent formed therein and positioned to capture the coupling pin, said channels positioned to be aligned with a horizontal slot of a mating male coupling member of another like pivot chain link.

2. A pivot chain link- according to claim 1 wherein:

said removable platform portion includes at least one downwardly extending tab attached to a bottom surface thereof; and said link portion includes an orifice for receiving said at least one downwardly extending tab, said orifice having an edge that may be engaged by said at least one downwardly extending tab; and said at least one downwardly extending tab having an edge to engage said orifice edge.

3. A pivot chain link according to claim 2, wherein:

said removable platform portion has forward teeth and rearward teeth, said forward teeth nestable with the rearward teeth of another removable platform portion such that when two chain links are combined a substantially continuous surface is formed.

4. A pivot chain link according to claim 1 wherein said platform portion has forward teeth and rearward teeth, said forward teeth nestable with said rearward teeth such that when two separate links are combined a substantially continuous surface is formed.

5. A platform portion of a conveyor link assembly according to claim 5 wherein said means for removably mounting said platform portion on a link includes at least one snap tab.

6. A pivot chain link according to claim 1, wherein:

said removable platform portion includes at least one downwardly extending tab attached to a bottom surface thereof;

said link portion includes an orifice for receiving said at least one downwardly extending tab, said orifice having an edge that may be engaged by said at least one downward extending tab; and said at least one downwardly extending tab having an edge to engage said orifice edge.

7. A pivot chain link according to claim 6, wherein:

said removable platform portion has forward teeth and rearward teeth, said forward teeth nestable with the rearward teeth of another removable platform portion such that when two chain links are combined a substantially continuous surface is formed.

* * * * *